United States Patent [19]
Core

[11] Patent Number: 5,578,224
[45] Date of Patent: Nov. 26, 1996

[54] METHOD OF MAKING MICROMACHINED DEVICE WITH GROUND PLANE UNDER SENSOR

[75] Inventor: Theresa A. Core, North Andover, Mass.

[73] Assignee: Analog Devices, Inc., Norwood, Mass.

[21] Appl. No.: 486,894

[22] Filed: Jun. 7, 1995

[51] Int. Cl.[6] .................................. H02P 6/16; H01G 5/16
[52] U.S. Cl. ............................... 216/2; 437/228; 437/921
[58] Field of Search .................................. 437/921, 919, 437/228; 216/2; 148/DIG. 159; 257/420, 417

[56] References Cited

U.S. PATENT DOCUMENTS

| | | |
|---|---|---|
| 4,312,117 | 1/1982 | Robillard et al. . |
| 4,802,952 | 2/1989 | Kobori et al. . |
| 4,808,549 | 2/1989 | Mikkor et al. . |
| 4,908,693 | 3/1990 | Nishiguchi . |
| 5,164,339 | 11/1992 | Gimpelson . |
| 5,314,572 | 5/1994 | Core et al. ........................ 156/643 |

OTHER PUBLICATIONS

"Surface Micromachined, Digitally Force–Balanced Accelerometer With Integrated CMOS Detection Circuitry," Yun, et al., IEEE Solid–State Sensor and Actuator Workshop, Hilton Head Island, SC, Jun. 22–25, 1992.

"Large Displacement Linear Actuator," Brennen, et al., IEEE Solid–State Sensor and Actuator Workshop, Hilton Head Island, SC, Jun. 4–7, 1990.

*Primary Examiner*—George Fourson
*Assistant Examiner*—Scott Kirkpatrick
*Attorney, Agent, or Firm*—Hale and Dorr

[57] ABSTRACT

A polysilicon ground plane is formed over dielectric layers and under a suspended, movable mass in a surface micromachined device. The process includes steps of forming a diffused region in a substrate, forming the dielectric layers over the substrate, forming the ground plane over dielectric layers, and forming a body having a suspended mass, a first anchor extending from the mass down to the diffused region, and a second anchor extending from the mass down to the ground plane. The two anchors are formed simultaneously. The ground plane, which can be formed with only three additional steps over prior processes, serves as a ground plane to control changes and also as a local interconnect.

13 Claims, 2 Drawing Sheets

METHOD OF MAKING MICROMACHINED DEVICE WITH GROUND PLANE UNDER SENSOR

FIELD OF THE INVENTION

This invention relates to micromachined devices and to a method for making micromachined devices.

BACKGROUND OF THE INVENTION

A process for making a micromachined accelerometer having a sensor area and a separate circuit area on one die is shown and described in U.S. Pat. No. 5,326,726, which is expressly incorporated herein by reference. As shown in FIG. 23 of the incorporated patent, the sensor area has a movable mass that is suspended with anchors over a surface of the die. The sensor area also has fixed beams suspended over the surface of the die so that capacitances between the movable mass and the fixed beams can be sensed. Dielectric layers are formed over the surface of the die and under the suspended mass. Charges that accumulate on these dielectric layers can be difficult to control. The dielectric layers are also useful and desirable, however, because they prevent leakage currents.

SUMMARY OF THE INVENTION

According to the present invention, a conductive layer is formed over a dielectric layer and under a suspended sensor mass in an integrated micromachined device. The conductive layer is electrically coupled to the mass and can serve both as a ground plane and as an interconnect for electrically coupling different parts of the sensor region. The conductive layer, which is preferably made of polysilicon, can be coupled to a circuit area or to a bond pad contact through a diffused region such that the polysilicon layer need not traverse a transition region between the sensor area and the circuit area.

One embodiment of a process according to the present invention includes the steps of forming a diffused region in a substrate; forming one or more dielectric passivation layer over the substrate; forming a conductive layer over the dielectric layer; forming a sensor having a suspended mass, a first anchor coupled to the diffused region, and a second anchor coupled to the conductive layer; and forming an exposed metal contact coupled to the diffused region. These steps are preferably performed in the order recited. The conductive layer is preferably formed by depositing a 3500 angstrom thick polysilicon layer and doping the layer until it has a surface resistance of about 60–80 ohms/square. The dielectric layer can be formed as a number of separate passivation layers, including one or more nitride and oxide layers.

Because the voltage of the conductive layer is controllable, it prevents charges from building up. The layer also can serve as a local interconnect between portions of the sensor and, through a diffused region, from these portions to circuitry in a circuit area or to a bond pad contact. With this diffused region, the conductive layer need not traverse a transition region between the circuit area and the sensor area. As a local interconnect the ground plane can couple different portions of the sensor, certain fixed beams.

Accordingly, the ground plane can perform several functions, is easy to fabricate, and requires few additional process steps compared to known processes. Other features and advantages will become apparent from the following detailed description, claims, and drawings.

DETAILED DESCRIPTION

According to the present invention, a conductive layer serves as a ground plane and can serve as an interconnect for a micromachined device. The conductive layer can be formed as part of an integrated micromachined process, such as the process disclosed in the incorporated U.S. Pat. No. 5,326,726, with a small number of altered steps and a small number of newly added steps. Specific aspects of the process described in the incorporated patent are not necessarily required; rather, this particular process is described here as an exemplary process for forming a micromachined device.

Figure 1:
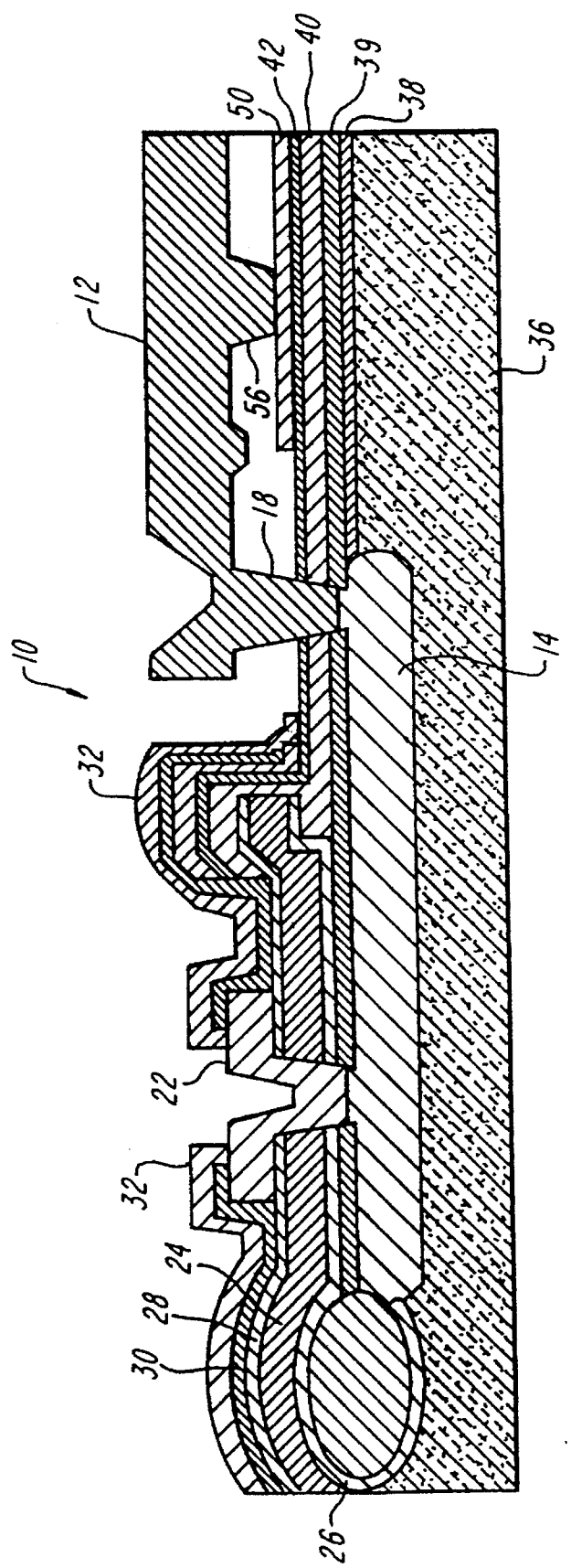
FIGS. 1 and 2 are cross-sectional views of a microstructure according to the present invention.

Referring to FIG. 1, an integrated micromachined device 10 is formed in a substrate 36, preferably with a process that is generally similar to that described in the incorporated patent. The process disclosed in that patent includes steps of forming a diffused region 14 in substrate 36, forming a plate 38 in the substrate adjacent the diffused region, forming dielectric layers 39, 40, and 42 over the plate and the diffused region (and hence over the substrate), forming a sensor having a suspended mass 12 and a first anchor 18 extending from mass 12 to diffused region 14, and forming an exposed metal contact 22 coupled to diffused region 14. The sensor is preferably formed by forming a sacrificial oxide (not shown) over the dielectric layers, forming a first opening in the sacrificial oxide and in the dielectric layers for the anchor, depositing polysilicon, and then eventually removing the sacrificial oxide. While one anchor is shown and described here, mass 12 is typically suspended by a plurality of anchors.

According to the present invention, the process further includes a step of forming a conductive ground plane 50 over the dielectric layers after the dielectric layers are formed and before the sensor is formed. When the sensor is formed, a second anchor 56 for coupling mass 12 to ground plane 50 is formed near first anchor 18 and at the same time. Accordingly, to form the sensor, a second opening is formed near the first opening so that the two anchors are made simultaneously. By using such a second anchor, there is no need for a second dedicated anchor mask and an additional anchor implant. Preferably, the steps recited above are performed in the order recited.

Compared to the exemplary process of the incorporated patent, the process of forming ground plane 50 preferably requires only three additional process steps. These steps would follow a sensor nitride deposition step ("PROCESS 40") and precede a spacer LTO deposit step ("PROCESS 42") in the process of the incorporated patent. The three additional steps are: (1) deposit ground plane polysilicon, preferably to a depth of 3500 angstroms; (2) implant the ground plane polysilicon, preferably with phosphorus with a doping level in the range of $4-8\times10^{15}/cm^2$ so that the polysilicon has a sheet resistance of about 60–80 ohms/square; and (3) mask the ground plane polysilicon.

Because the parasitic capacitance between the polysilicon ground plane and the substrate is large, this capacitance should be taken into account in the design. In particular, the capacitance for the polysilicon, 1200 angstrom nitride layer, 700 angstrom oxide layer, and silicon substrate typically is about $2.88\times10^{-16}$ F/micron$^2$; over the diffused regions, where the oxide is about 1000 angstroms, the capacitance between the polysilicon ground plane and the substrate typically is about $2.36\times10^{-16}$ F/ micron$^2$.

Figure 2:
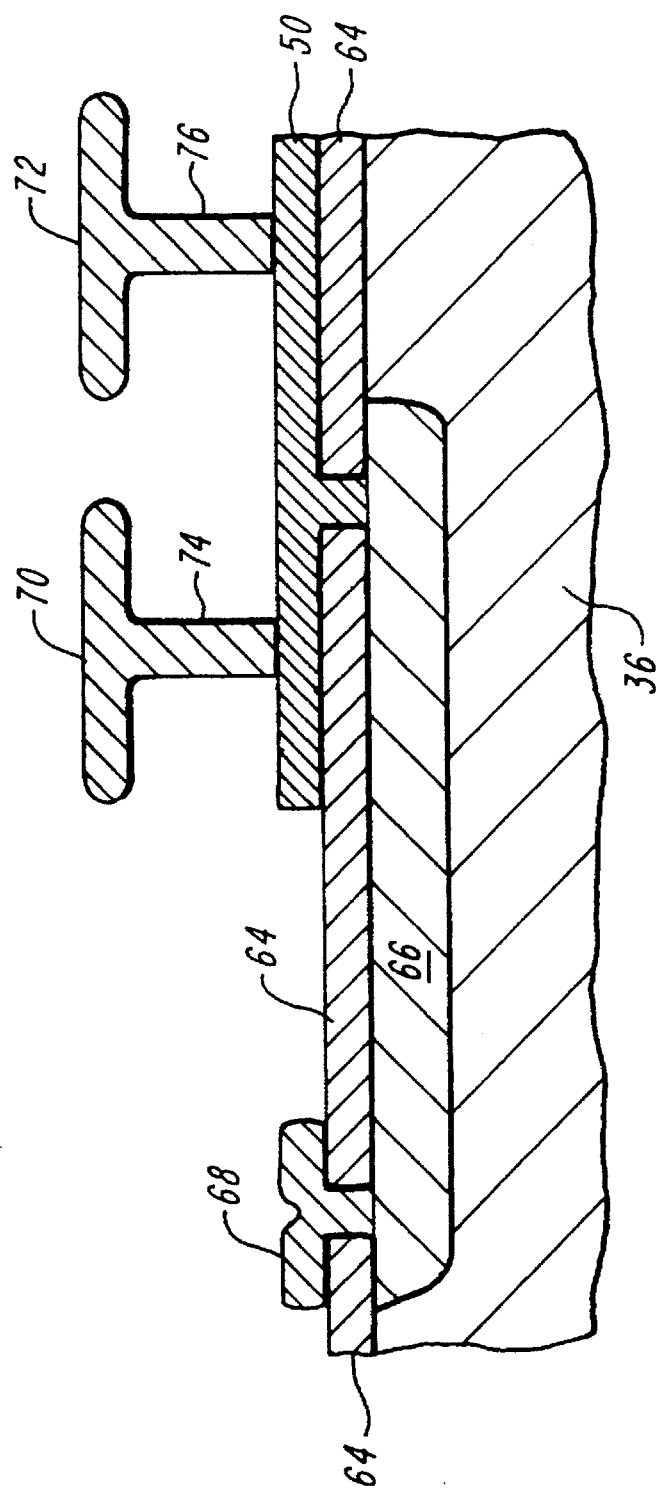

Referring to FIG. 2, conductive ground plane 50 extends through an opening in dielectric layer 64 and contacts a diffused runner 66. Runner 66 extends from ground plane 50 to a metal contact 68, which also extends through an opening in dielectric layer 64 (layer 64 is shown here in a representative form, but could include other materials around contact 68 as in FIG. 1). Alternatively, diffused region 66 could extend to other circuitry in a circuit area on the die. Diffused runner 66, like diffused region 14, is preferably an N+region, and substrate 36 is preferably P-type.

The sensor can be made up of multiple portions, including beams 70, 72, shown here in general form. Beams 70, 72 could be beams that are fixed relative to substrate 36. Anchors 74, 76 couple fixed beams 70, 72 to the surface to suspend these beams over ground plane 50. The ground plane also electrically connects beams 70, 72, thus avoiding the need for additional diffused runners between anchors 74, 76.

Having described a preferred embodiment of the present invention, it should be apparent that other modifications can be made without departing from the scope of the appended claims. For example, certain details, such as thicknesses, doping levels, and conductivity can be altered as desired. Also, the process of the present invention need not be used only with the specific steps in the incorporated patent; rather the various forming steps could be altered or improved. For example, there need not necessarily be two oxide layers and a nitride layer as the dielectric layers; rather, it is only necessary to have at least one dielectric layer.

What is claimed is:

1. A process for making a micromachined device in a substrate comprising the steps of:
    (a) forming a diffused region in the substrate;
    (b) forming a dielectric layer over the substrate and over at least a portion of the diffused region;
    (c) forming a conductive layer over a portion of the dielectric layer;
    (d) forming at least one opening in the dielectric layer over the diffused region; and
    (e) forming a body including a mass suspended over at least part of the conductive layer, a first anchor extending from the mass through the opening and to the diffused region, and a second anchor extending from the mass to the conductive layer.

2. The process of claim 1, wherein steps (a)-(e) are performed in the order recited.

3. The process of claim 1, wherein step (b) includes steps of forming an oxide layer and forming a nitride layer.

4. The process of claim 1, wherein in step (e), the first and second anchors are formed simultaneously.

5. The process of claim 1, wherein step (c) includes depositing a layer of polysilicon and doping the polysilicon to a sheet resistance of about 60–80 ohm/ square.

6. The process of claim 1, wherein step (e) includes the steps of forming an oxide layer, forming openings in the oxide layer, providing polysilicon in the openings to form the anchors and over the oxide to form the mass, and removing at least some of the oxide from under the polysilicon mass.

7. The process of claim 1, further comprising the step of forming a second diffused region, wherein the conductive layer is coupled to the second diffused region.

8. The process of claim 7, wherein the second diffused region extends from the conductive layer to a contact.

9. The process of claim 1, further comprising the step of forming an exposed metal contact extending to the diffused region.

10. A process for making a micromachined device in a substrate, the process comprising the steps of:
    (a) forming a first diffused region in the substrate;
    (b) forming a dielectric layer over the substrate and over the first diffused region;
    (c) forming a conductive layer over part of the dielectric layer;
    (d) forming a sacrificial layer over part of the dielectric layer and over at least part of the conductive layer;
    (e) forming a first opening in the sacrificial layer, the first opening extending to the first diffused region;
    (f) forming a second opening in the sacrificial layer, the second opening extending to the conductive layer;
    (g) forming a body over the sacrificial layer, the body including a mass over the sacrificial layer, a first anchor extending from the mass through the first opening to the diffused region, and a second anchor extending from the mass through the second opening to contact the conductive layer; and
    (h) removing the sacrificial layer to leave the mass suspended over the conductive layer with first and second anchors.

11. The process of claim 10, wherein steps (e) and (f) are performed simultaneously.

12. The process of claim 10, the process including, prior to step (b), a step of forming a second diffused region; and prior to step (c), forming an opening in the dielectric layer extending to the second diffused region so that when step (c) is performed, the conductive layer extends through the opening in the dielectric layer to the second diffused region.

13. A process for making a micromachined device in a substrate, the process comprising the steps of:
    (a) forming a first diffused region in the substrate;
    (b) forming a dielectric layer over the substrate and over the first diffused region;
    (c) forming a conductive layer over part of the dielectric layer;
    (d) forming an oxide layer over part of the dielectric layer and over at least part of the conductive layer;
    (e) forming a first opening in the oxide layer, the first opening extending to the first diffused region;
    (f) forming a second opening in the oxide layer, the second opening extending to the conductive layer; and
    (g) forming a body over the oxide layer, the body including a mass over the oxide layer, a first anchor extending from the mass through the first opening to the diffused region, and a second anchor extending from the mass through the second opening to contact the conductive layer.

* * * * *